United States Patent [19]
Yano et al.

[11] 3,872,204
[45] Mar. 18, 1975

[54] METHOD FOR CONTINUOUSLY MANUFACTURING SHAPED GYPSUM ARTICLES

[75] Inventors: Tsuyoshi Yano; Hiroshi Onishi; Inahide Tanaka, all of Tokyo, Japan

[73] Assignee: Onoda Cement Co., Ltd., Onoda, Yamaguchi-ken, Japan

[22] Filed: Aug. 2, 1972

[21] Appl. No.: 277,372

[30] Foreign Application Priority Data
Aug. 5, 1971 Japan.............................. 46-58674

[52] U.S. Cl................. 264/102, 106/109, 106/111, 106/315, 264/150, 264/176 R, 264/236, 264/333
[51] Int. Cl....................... B28b 21/52, C04b 11/00
[58] Field of Search........ 264/150, 148, 176 R, 236, 264/333, 102, 86, 87; 106/109–111, 315

[56] References Cited
UNITED STATES PATENTS

| | | | |
|---|---|---|---|
| 1,600,552 | 9/1926 | Makowski | 106/110 |
| 1,995,412 | 3/1935 | Batcheller | 106/DIG. 4 |
| 2,527,390 | 10/1950 | Blaha | 264/86 |
| 2,531,496 | 11/1950 | Bean et al. | 106/110 |
| 3,219,467 | 11/1965 | Redican et al. | 264/176 R |
| 3,311,516 | 3/1967 | Jaunarajs et al. | 106/110 |

*Primary Examiner*—Jeffery R. Thurlow
*Attorney, Agent, or Firm*—Brown & Martin

[57] ABSTRACT

A method for continuously manufacturing shaped gypsum articles which comprises mixing insoluble anhydrite with an accelerator for the setting, bentonite, methyl or ethyl alcohol and a proper amount of water, kneading the mixture to obtain a doughy paste, and extruding said paste continuously to manufacture shaped articles, followed by the setting thereof.

4 Claims, 1 Drawing Figure

3,872,204
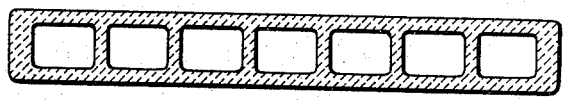

METHOD FOR CONTINUOUSLY MANUFACTURING SHAPED GYPSUM ARTICLES

This invention relates to a method for manufacturing shaped gypsum articles, and more particularly to a method for continuously manufacturing shaped gypsum articles by means of extrusion.

Heretofore, there have been widely used building articles formed of raw gypsum such as gypsum plaster or gypsum boards. Most of these gypsum articles consist of hydrophilic hemihydrate or III type soluble anhydrite and set very quickly, for example, in several minutes due to hydration of the raw material. For operating convenience of manufactures, therefore, the above-mentioned raw gypsum is generally mixed with an organic solidification retarder such as gelatine, starch, casein or sodium citrate in order to purposely delay said setting time. Since, however, addition of such organic retarder reduces the mechanical strength of product, the aforementioned building articles fail to be used in the applications where there is demanded great mechanical strength.

On the other hand, the insoluble anhydrite mainly constituting the so-called Keene's cement, kind of plaster, presents little progress in the reaction of hydration solidification simply by adding water thereto. In practical application, therefore, the Keene's cement is generally mixed with an accelerator for the setting such as alum or sulfates. Addition of such accelerator, which is of inorganic material, does not weaken the mechanical strength of the resultant product. Though applicable in preparing coatings for the walls and floors or molded articles as a noticeable material meeting demand for high mechanical strength, the Keene's cement requires an uneconomical and inefficient mold in fabricating the aforesaid product, failing to effect the continuous mass production of shaped gypsum articles by means of extrusion. The reason is that where there is extruded a paste prepared by adding a proper amount of water to the insoluble anhydrite containing a setting accelerator, then there are expelled from the paste water and said accelerator impregnated in the paste under extrusion pressure, obstructing the proper extrusion and setting of the paste.

It is accordingly the object of this invention to provide a method for continuously and efficiently manufacturing by extrusion excellent shaped gypsum articles as structural materials of great mechanical strength.

The object is attained by the method of this invention which consists in mixing insoluble anhydrite with an ordinary accelerator for the setting, bentonite, methyl or ethyl alcohol and a proper amount of water; kneading the mixture into a doughy paste; continuously shaping the paste by forcing it through an extruder; and cutting the extruded product in proper size, followed by curing and setting.

For extrusion of paste of insoluble anhydrite containing a solidification accelerator, it is necessary to render the paste water-retentive and plasticizable, and impregnate the paste with such a shaping agent as is little liable to decrease the mechanical strength of final product. As the result of various experiments, the inventors have found that clays, particularly bentonite is most suitable as such a shaping agent. The reason is that addition of small amounts of bentonite, for example, 3 to 10 parts by weight, preferebly 4 to 7 parts by weight (hereinafater, the term "parts" means "parts by weight") based on 100 parts of insoluble anhydrite imparts water retentivity and plasticity to the paste to permit its very smooth extrusion, and moreover does not exert any substantial harmful effect on the mechanical strength of final product.

However, paste prepared by adding bentonite to insoluble anhydrite containing a setting accelerator presents difficulties in obtaining a final product with dimensional precision, because addition of bentonite which tends to present noticeable swelling gives rise to the prominent initial expansion of the paste. Further, the swelling of bentonite leads to the occurrence of fine hair cracks in the paste, rendering the final product considerably brittle. The inventors have conducted studies to eliminate the above-mentioned drawbacks and found that addition of both bentonite and methyl or ethyl alcohol to the paste prominently minimizes its initial expansion and saves the paste from fine hair cracks, and further that incorporation of said alcohol decreases the drying shrinkage of wet bentonite. As described above, impregnation of bentonite and methyl or ethyl alcohol provides an excellent final product which is prominently elevated in dimensional precision and free from fine hair cracks and displays great mechanical strength and low hygroscopicity.

Addition of methyl or ethyl alcohol is preferred to be effected at the rate of 1 to 4 parts based on 100 parts of insoluble anhydrite. Use of more than 4 parts of said alcohol obstructs the hydration of the insoluble anhydrite to reduce the mechanical strength of the final product. A shaping agent consisting of common clays has to be blended in relatively large amounts, necessitating the considerable addition of said alcohol. Therefore, the shaping agent should be formed of bentonite.

The setting accelerator may consist of any type heretofore used to promote the solidification of the insoluble anhydrite. Common setting accelerators include sulfates, double salts thereof, CaO, Ca(OH)$_2$, Mg(OH)$_2$, Portland cement, basic slag and silica gel. For the method of this invention, however, alums, particularly potassium alum has the most excellent effect among these materials on the mechanical strength of the final product. The desired addition of the setting accelerator ranges between 0.5 and 2.5 parts or preferably between 1.0 and 2.0 parts based on 100 parts of the insoluble anhydrite.

The insoluble anhydrite may be prepared from gypsum materials such as natural gypsum or any kind of byproduct gypsum. Further, the calcining temperature of the raw gypsum and the fineness of calcined powder may be suitably chosen.

The amount of water required to prepare a doughy paste is set at 20 to 30 parts based on 100 parts of the insoluble anhydrite to effect the smooth extrusion of the paste. In this case it is necessary that the amount of water being added be so chosen as to cause an extruded soft article to have a sufficient degree of consistency to prevent its ready deformation and display a full hydration reaction. When less than 20 parts of water is used, the extrusion would become difficult because of high stiffness of the doughy paste, and when more than 30 parts of water is used, the extruded substance would be liable to deform its shape.

According to the method of this invention, there are manufactured a large number of shaped articles having the prescribed dimensions by cutting off the extruded paste in proper size. These articles are allowed to stand in a room for the natural progress of hydrating reaction. While there are required about seven days for the articles to attain a maximum mechanical strength, they would obtain practically useful strength in about three days.

There were tested the physical properties of shaped articles prepared by mixing 100 parts of insoluble anhydrite obtained by calcining a phosphogypsum about 10 minutes at a temperature of 900°C with 1.5 parts (by anhydride base) of potassium alum as a setting accelerator, prescribed amounts of bentonite and alcohol given in Table 1 below and a proper amount of water, kneading and extruding the mixture and finally allowing it to stand in a chamber, the results being presented in Table 1.

demanded of the final product. Though the drying shrinkage of product is less satisfactory in the case of ethyl alcohol than when methyl alcohol is used, yet said shrinkage is more noticeably reduced than when there is not added any alcohol.

The method of this invention allows the paste to be mixed, if necessary, with many other additives such as fibrous materials for reinforcement or pigments or dyestuffs for coloration. Particularly, incorporation of fibrous material for reinforcement has a prominent effect of elevating the bending strength and impact strength of product. The fibrous material may consist of glass fiber or any kind of synthetic resin fibers. In this case, addition of the fibrous material is chosen to be from 1 to 5 parts.

Table 1

| No. of experiment | Data of experiments Added material | | | Initial expansion ($\times 10^{-4}$) of extruded paste | |
|---|---|---|---|---|---|
| | Bentonite (wt. part) | Alcohol (wt. part) | Water (wt. part) | after 16 to 18 hours | after 24 hours |
| 1 | 5 | | 0 | 22.5 | 105.8 | 103.3 |
| 2 | 5 | | 1.6 | 23.0 | 13.14 | 13.21 |
| 3 | 10 | Methyl | 1.9 | 27.0 | 32.50 | 33.78 |
| 4 | 20 | alcohol | 2.1 | 30.0 | 92.78 | 94.71 |
| 5 | 30 | | 2.4 | 34.0 | cracked after 5 hours | cracked after 5 hours |
| 6 | 5 | | 1.2 | 23.0 | 56.14 | 55.93 |
| 7 | 5 | Methyl | 2.3 | 23.0 | 26.36 | 26.71 |
| 8 | 5 | alcohol | 4.6 | 23.0 | 2.57 | 4.50 |
| 9 | 5 | | 6.0 | 23.0 | −3.71 | −4.07 |
| 10 | 5 | Ethyl | 1.2 | 23.0 | 47.93 | 47.71 |
| 11 | 5 | alcohol | 2.3 | 23.0 | 46.21 | 43.21 |
| 12 | 5 | | 4.6 | 23.0 | 32.00 | 33.85 |

| No. of experiment | Bending strength (Kg/cm²) of final product | | Compressive strength (Kg/cm²) of final product | | Drying shrinkage ($\times 10^{-4}$) of final product | |
|---|---|---|---|---|---|---|
| | 1 day after initial expansion of 24 hours | 7 days (the same) | 1 day (the same) | 7 days (the same) | 1 day (the same) | 7 days (the same) |
| 1 | 90 | 153 | 300 | 496 | 4.02 | 8.13 |
| 2 | 108 | 169 | 298 | 500 | 0.43 | 1.85 |
| 3 | 98 | 165 | 193 | 396 | 0.28 | 4.64 |
| 4 | 58 | 117 | 119 | 293 | 3.43 | 8.07 |
| 5 | 33 | 60 | 60 | 214 | 4.85 | 9.42 |
| 6 | 116 | 170 | 280 | 530 | −1.07 | 2.43 |
| 7 | 110 | 165 | 280 | 461 | −1.00 | 0.26 |
| 8 | 55 | 88 | 153 | 250 | −1.43 | 0.64 |
| 9 | 19 | 28 | 43 | 88 | 0.86 | 3.29 |
| 10 | 119 | 173 | 279 | 583 | −1.57 | 3.57 |
| 11 | 90 | 156 | 271 | 560 | 3.43 | 6.43 |
| 12 | 68 | 140 | 187 | 490 | 2.92 | 7.21 |

Table 1 above shows the following facts. Addition of about 5 percent by weight of bentonite fully serves the purpose. Use of even 1 percent by weight of alcohol reduces the initial expansion of the extruded paste to about half that extent might take place in the absence of alcohol.

The larger the addition of methyl alcohol, the more suppressed the initial expansion of the extruded paste. In view of the mechanical strength demanded of a final product, however, addition of said alcohol is preferred to be about 2 percent by weight. The drying shrinkage of the final product does not widely vary with the amount of methyl alcohol added.

While any amount of ethyl alcohol added does not give rise to prominent changes in the initial expansion of the extruded paste, it is preferred that said alcohol be applied at the rate of 2 percent by weight at maximum from the standpoint of the mechanical strength The outstanding feature of the method of this invention consists in attaining the shaping of gypsum articles by extrusion which has heretofore been considered impossible. Obviously this invention admits of casting or pressing practised in the past. However, extrusion makes it possible to manufacture continuously as well as efficiently compact articles of complicated shape such as hollow panels. Gypsum articles extruded by the method of this invention have excellent physical properties such as great mechanical strength and low hygroscopicity and drying shrinkage.

An extruder used to practise the method of this invention need not be of a special type, but may consist of a typical type applied with respect to clays or greens for earthenware making. The extruding pressure is about 10 to 12 Kg/cm². When, in the extruding operation, the section of the extruder disposed just ahead of that where its die is supplied with final pressure is evacuated by a vacuum pump to expel air bubbles entrained in the paste, then the resultant product will be increased in density and further improved in physical properties. In this case, the vacuum degree of the degassing vacuum chamber is about −720mmHg.

Shaped product obtained by the method of this invention can be used as fully non-combustible material over a wide field of structural material for building which have heretofore been unable to be formed of the prior art gypsum product, for example, flooring, roofing, columns, beams, curtain walls and partition walls.

This invention will be more fully understood by reference to the examples which follow. Throughout the examples, parts are by weight.

The appended FIGURE is a cross-sectional view of the article produced in the following examples.

EXAMPLE I

One hundred parts of insoluble anhydrite powders derived from phosphogypsum, which were calcined 10 minutes at a temperature of 900°C, were mixed 25 minutes with 5 parts of bentonite and 1.5 parts of polyvinyl chloride fibers of 15 deniers and 10 mm long in a Nautamixer so as to fully disperse said fibers in the calcined powders. To this mixture were added 1.5 parts (anhydride base) of potassiuim alum, 1.4 parts of methyl alcohol and 23 parts of water. The mass was kneaded 2 minutes first in an Eirich-type batch mixer by rotating it at high speed, and then in a clay kneader until there was formed a suitable doughy paste. The paste was supplied to a screw type extruder and passed through a degassing vacuum chamber evacuated to −720 mmHg, and then through a hollow die 60 mm high and 480 mm wide at a pressure of 10 to 12 Kg/cm², obtaining a continuously extruded band of the dough which has a cross section shown in the appended drawing. The band was moved at a speed of 80 meters per hour by a belt conveyer, and, one hour after extrusion, was continuously cut off in proper length. Two hours after extrusion each cut panel solidified to such an extent that it could be carried by a fork lift truck. The panels were left in a product yard in heaps each consisting of ten superposed pieces. Seven days later, the physical properties of the panels were tested, the results being presented in Table 2 below.

Table 2

Physical properties of the product

| | |
|---|---|
| Compressive strength | 3020 t/m² |
| Bending strength | 261 Kg.m |
| Shrinkage | 0.035 % |
| Hygroscopicity | 7.6 % |
| Dimensional precision | 1.1 mm |
| Sound absorptivity | 37.5 % (500 Hz) |
| Permeation loss of sound | −35 dB (500 Hz) |
| Apparent bulk density | 735 Kg/m³ |
| Fire resistance (30 minutes) | successful |
| Impact resistance | 10 Kg.m |

EXAMPLE II

One hundred parts of insoluble anhydrite powders used in Example I were mixed 10 minutes in a Nautamixer with 5 parts of bentonite and 3.0 parts of chopped strand glass fiber of 6 deniers and 10 mm long so as to fully disperse the fibers in the calcined powders. To the mixture were added 1.5 parts (anhydride base) of potassium alum, 1.6 parts of methyl alcohol and 23 parts of water. The mass was mixed 10 minutes in a special paddle-type mixer by rotating it sufficiently slowly to prevent the glass fibers from being broken, and then in a clay kneader until there was obtained a suitable dough. Later, there were produced panels having the same shape as those of Example I through the same operation. Tests were made on the physical properties of the panels which had been allowed to stand for seven days after extrusion, the results being given in Table 3 below.

Table 3

Physical properties of the product

| | |
|---|---|
| Compressive strength | 2490 t/m² |
| Bending strength | 288 Kg·m |
| Shrinkage | 0.040 % |
| Hygroscopicity | 7.8 % |
| Dimensional precision | 0.9 mm |
| Sound absorptivity | 37.5 % (500 Hz) |
| Permeation loss of sound | −35 dB (500 Hz) |
| Apparent bulk density | 735 Kg/m³ |
| Fire resistance (30 minutes) | successful |
| Impact resistance | 6 Kg·m |

EXAMPLE III

One hundred parts of insoluble anhydrite used in Example I were mixed 3 minutes with 5 parts of bentonite and 1.5 parts (anhydride base) of potassium alum, in an Eirich-type batch mixer by rotating it at low speed so as to effect dry mixing. To the mixture were added 1.6 parts of methyl alcohol and 23 parts of water. The mass was kneaded in a clay kneader until there was formed a proper dough. Later, there were produced panels having the same shape as those of Example I through the same operation. Tests were made in the same manner as those of said Example, the results being indicated in Table 4 below.

Table 4

Physical properties of the product

| | |
|---|---|
| compressive strength | 2990 t/m² |
| Bending strength | 249 Kg·m |
| Shrinkage | 0.038 % |
| Hygroscopicity | 7.6 % |
| Dimensional precision | 1.2 mm |
| Sound absorptivity | 37.4 % (500 Hz) |
| Permeation loss of sound | −37 dB (500 Hz) |
| Apparent bulk density | 825 Kg/m³ |
| Fire resistance (30 minutes) | successful |
| Impact resistance | 2 Kg·m |

EXAMPLE IV

One hundred parts of insoluble anhydrite powders used in Example I were mixed 25 minutes in a Nautamixer with 4 parts of bentonite and 2.5 parts of polyvinyl chloride fibers of 15 deniers and 10 mm long so as to fully disperse the fibers in the calcined powders. To the mixture were added 2.0 parts (anhydride base) of ammonium alum, 2.3 parts of ethyl alcohol and 23 parts of water. Later, there were produced panels having the same shape as those of Example I through the same operation as in said example. Tests were made in the same manner as those of said example, the results being given in Table 5 below.

Table 5

| Physical properties of the product | |
| --- | --- |
| Compressive strength | 2880 t/m² |
| Bending strength | 248 Kg·m |
| Shrinkage | 0.052 % |
| Hygroscopicity | 7.8 % |
| Dimensional precision | 1.0 mm |
| Sound absorptivity | 37.5 % (500 Hz) |
| Permeation loss of sound | −35 dB (500 Hz) |
| Apparent bulk density | 758 Kg/m³ |
| Fire resistance (30 minutes) | successful |
| Impact resistance | 11 Kg·m |

EXAMPLE V

One hundred parts of insoluble anhydrite powders used in Example I were mixed 25 minutes in a Nauta-mixer with 7 parts of bentonite and 5.0 parts of polyvinyl chloride fibers of 15 deniers and 10 mm long so as to fully disperse the fibers in the calcined powders. To the mixture were added 1.5 parts (anhydride base) of potassium alum, 1.4 parts of ethyl alcohol and 25 parts of water. Later, there were produced panels having the same shape as those of Example I through the same operation as in said Example. Tests were made in the same manner as those of Example I, the results being given in Table 6 below.

Table 6

| Physical properties of the product | |
| --- | --- |
| Compressive strength | 2750 t/m² |
| Bending strength | 241 Kg·m |

Table 6 — Continued

| | |
| --- | --- |
| Shrinkage | 0.039 % |
| Hygroscopicity | 8.2 % |
| Dimensional precision | 1.1 mm |
| Sound absorptivity | 37.8 % (500 Hz) |
| Permeation loss of sound | −35 dB (500 Hz) |
| Apparent bulk density | 722 Kg/m³ |
| Fire resistance (30 minutes) | successful |
| Impact resistance | 11 Kg·m |

The single FIGURE of drawing illustrates a typical cross section of an extruded article in accordance with the invention.

What we claim is:

1. A method for continuously manufacturing shaped gypsum articles comprising mixing 100 weight parts of insoluble anhydrite with from 0.5 to 2.5 weight parts of an alum as an accelerator for the setting, from 3 to 10 weight parts of bentonite, from 1 to 4 weight parts of alcohol selected from the group consisting of methyl alcohol and ethyl alcohol, and from 20 to 30 weight parts of water; kneading the mixture to obtain a doughy paste; extruding the doughy paste to obtain a continuous band of shaped dough through a die wherein the extruding pressure is substantially 10 to 12 Kg/cm² cutting said band into a number of shaped soft articles; and causing said articles to set at room temperature and atmospheric pressure.

2. A method according to claim 1 wherein, immediately prior to extruding, the doughy paste is passed through a degassing vacuum chamber arranged in the extruder, the vacuum degree of said degassing chamber approximating minus 720mmHg.

3. A method according to claim 1, wherein bentonite is mixed at the ratio of from 4 to 7 weight parts.

4. A method according to claim 1, wherein from 1 to 5 weight parts of fibrous material are added to the mixture before kneading.

* * * * *